Sept. 6, 1932.　　　J. B. PRIDGEN　　　1,875,492
ROAD GRADING MACHINE
Filed June 24, 1931　　2 Sheets-Sheet 2
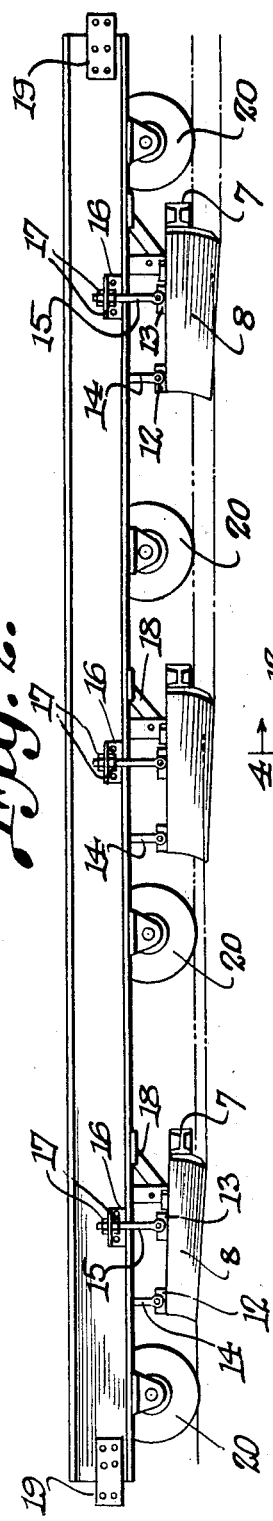
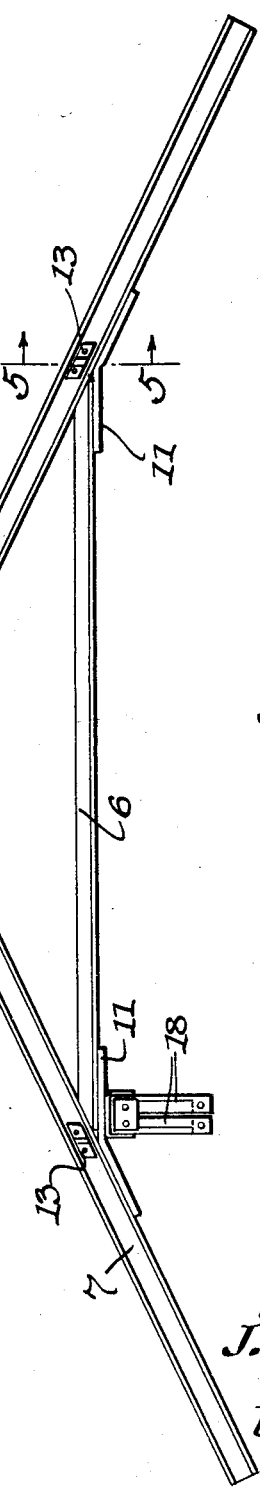
Inventor
J. B. Pridgen
by Lester Sargent
Atty.

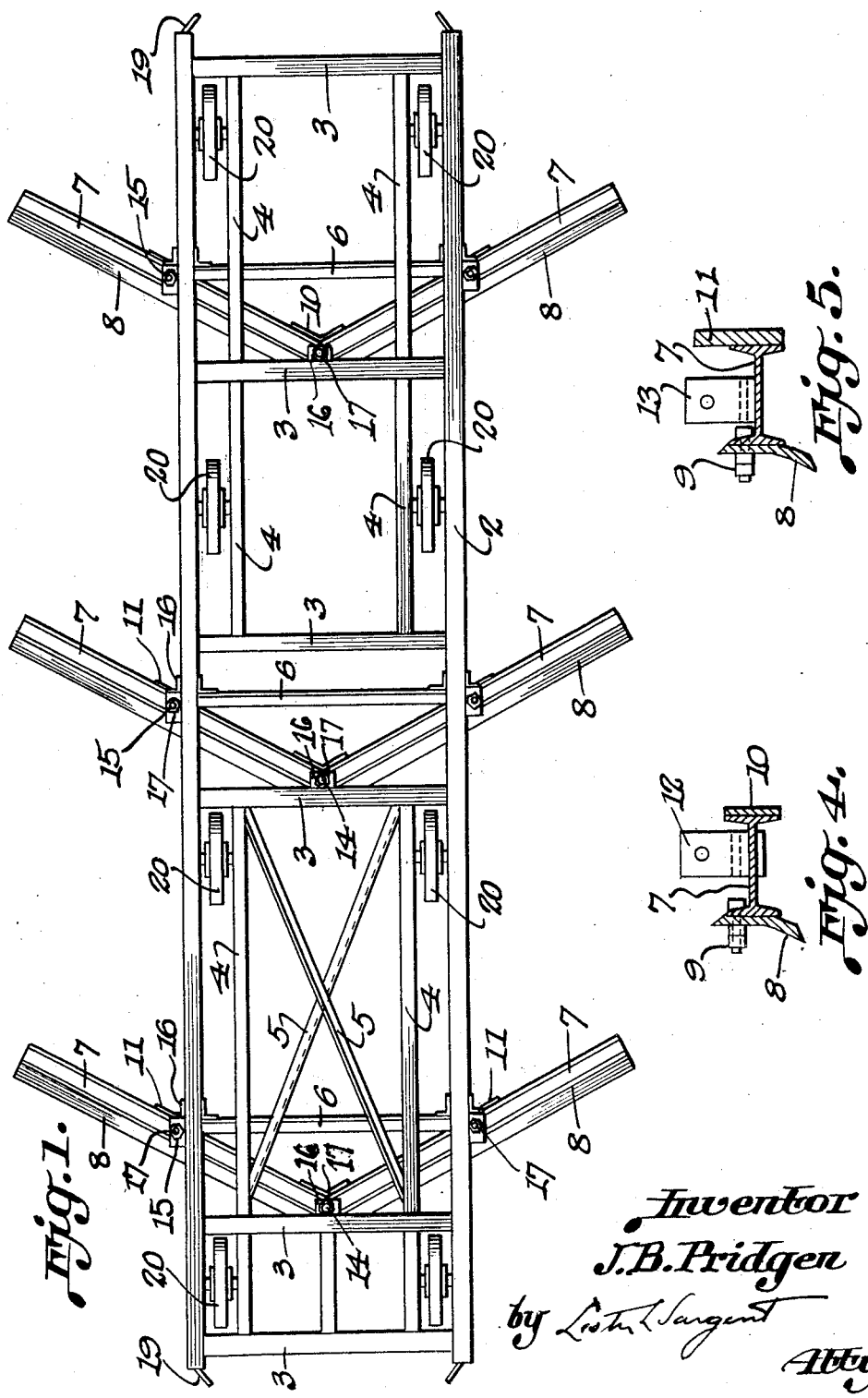

Patented Sept. 6, 1932

1,875,492

UNITED STATES PATENT OFFICE

JOHN BAILEY PRIDGEN, OF CHARLOTTE, NORTH CAROLINA

ROAD GRADING MACHINE

Application filed June 24, 1931. Serial No. 546,631.

The object of my invention is to provide an improved road grading machine having the frame of the machine so arranged as to lighten the weight of the machine to a sufficient extent so that it will not be too heavy to be drawn by a tractor or other power but will be sufficiently heavy to effectively grade or smooth the road.

It is also an object of my invention to provide a plurality of operating blades; and to provide adjusting means for same whereby the blades may be adjusted to operate at different depths so that all blades of the machine will do work.

It is also an object of my invention to provide a machine in which the blades may be replaced by blades of different length for any width of road. It is a further object of my invention to provide a novel series of leveling wheels whereby the wheels will support the weight of the machine when unevenness in the road bed is encountered, to effect a more even grading of the road.

I attain these and other objects of my invention by the machine illustrated in the accompanying drawings, in which—

Figure 1 is a top plan view of my road machine;

Fig. 2 is a side elevation of same:

Fig. 3 is a detail top plan view of the members to which the cutting blades are attached, the cutting blades themselves not being shown;

Fig. 4 is a section on line 4—4 of Fig. 3 but with the cutting blade 8 shown attached; and Fig. 5 is a section on line 5—5 of Fig. 3 with the cutting blade 8 attached.

Like numerals designate like parts in each of the several views.

Referring to the accompanying drawings, I provide a main frame consisting of heavy outer longitudinal I-beams 2, cross-beams 3 and inner longitudinal beams 4. I may also provide suitable diagonally arranged bracing beams or bars 5 as shown in Fig. 1.

I provide a series of road cutting blades 8 fastened by bolts 9 to I-beams 7 as shown in Figs. 1, 4 and 5, the beams 7 being reinforced or braced by the cross-beams 6 which are positioned at about one inch above the plane in which the cutting edge of the blade is positioned. I provide suitable brace plates 10 at the apex of the beams 7 and brace and wear plates 11 at the junction of beams 6 and 7 as shown in Fig. 3. Beams 7 are suspended from the main frame of the machine by plates 12 and 13 secured thereto as shown in Figs. 3, 4 and 5, and by the threaded rods 14 and 15 respectively which are attached to plates 12 and 13. The threaded ends of rods 14 and 15 extend through apertures in brackets 16 and are adjustably held by the nuts 17 which are arranged above and below the horizontal portion of the L-shaped brackets 16. Brackets 16 are bolted to the longitudinal beams 2 and cross-beams 3 as shown in Figs. 1 and 2. I provide brace members 18 bolted to the main frame of the machine and in contact with members 11 to reinforce the members 6 and 7, as shown in Figs. 2 and 3.

At each end of the machine I provide similar apertured tongue plates 19 to which chains, not shown, may be fastened, the chains in turn attached to a suitable tractor or tractors for operating the road machine.

An important feature of my invention is the series of wheels 20 of which there may be either three or four sets in spaced relation and which function to support the weight of the machine when a depression in the road is encountered by the blades between any spaced sets of wheels whereby a more even road-bed is made.

In operation a tractor is attached to the tongue plates 19 by chains, and the several blades 8 are adjusted to operate at successively deeper levels as shown by the dotted lines in Fig. 2, the second set of blades being usually set for operation at a fourth inch lower level than the first set of blades, and the third set of blades at a fourth-inch lower level than the second set of blades whereby all three sets of blades will be performing work simultaneously as the machine is drawn along the road-bed. This adjustment is effected by adjusting the bolts 17 to raise or lower the rods 15, the upper ends of which are threaded, and thereby to raise or lower each of the blade units, namely the beams 7, plates 9, reinforcing beams 6 and the attached brace plates. The cross-beams 6 are positioned at a slightly higher level than the cutting blades 8 to prevent operation of the cross-beams on the road-bed. Such adjustment is conveniently and quickly accomplished and is made whenever conditions of the road-bed require that the blades be set for operating at a less or greater depth.

An important improvement in this machine is attained by the provision of a series of spaced wheels 20 of which at least three sets are provided, as shown in Fig. 2, and which function to support the weight of the machine at points where there is a depression in the road-bed so that the blades will cut a more even surface along the road-bed instead of falling into depressions as is the case with road machines of the type having a single cutting blade. Thus the weight of the machine may at one time be supported by the front and intermediate wheels and the rear wheels may clear the ground; or the weight of the machine may be supported by the front and rear set of wheels and the intermediate wheels may clear the ground; or if the road-bed is perfectly level all three sets of wheels will rest on the ground.

I heretofore constructed machines in which the blades were disposed entirely under the main frame of the machine but such construction resulted in a machine too heavy to be drawn by a tractor of ordinary size, and by providing a relatively narrow main frame structure as shown in Fig. 1, with the cutting blade units projecting laterally of the main frame to a substantial distance as shown, a machine of the desired weight was obtained. It will be noted that the machine is mainly constructed from I-beams and angle plates such as are used in building construction and that thereby I am able to utilize left-over materials from building structures which can be obtained at relatively small cost.

While I prefer to run the machine on to a conventional turn table and thus reverse it for operation in a reverse direction when desired, yet it is within the contemplation of my invention to provide suitable apertures in the cross-beams 3 so that the blade-supporting beams 7 and the brackets 16 may be moved to a reverse position, the brackets also being shifted to a suitable adjusted position on the beams to permit of a reverse position of the cutting blade units.

What I claim is:

1. In a road grading machine, the combination of heavy longitudinal beams, a plurality of cross-beams attached to the longitudinal beams and together constituting the main frame, a series of blade units comprising blade carrying beams arranged in V-form and disposed beneath the main frame of the machine, cutting blades attached to said blade supporting members, said blades and supporting members projecting laterally considerably beyond the main frame of the machine to operate to the desired width on the road to reduce the weight of the machine without reducing its range of operation, and means for independently adjusting the blade units for operating at successively deeper levels on the road-bed.

2. In a road grading machine, the combination of heavy longitudinal beams, a plurality of cross-beams attached to the longitudinal beams and together constituting the main frame, a series of blade units comprising blade carrying beams arranged in V-form and disposed beneath the main frame of the machine, cutting blades attached to said blade supporting members, said blades and supporting members projecting laterally considerably beyond the main frame of the machine to operate to the desired width on the road to reduce the weight of the machine without reducing its range of operation, means for independently adjusting the blade units for operating at successively deeper levels on the road-bed, and a series of wheels arranged at the forward, intermediate and rear portions of the machine to support the weight of the machine when a depression in the road-bed is encountered to level the road-bed and to prevent any of the blades from digging down into depressions in the road-bed whereby a smooth road-bed will be obtained.

3. In combination with the mechanism defined in claim 2, reinforcing beams affixed to the blade supporting beams and disposed in a plane sufficiently above the cutting level of the blades to prevent operation of the cross-beams on the road-bed, and reinforcing members affixed to the longitudinal beams and reinforcing the blade supporting members.

4. In a road grading machine, the combination of spaced longitudinal I-beams, cross beams rigidly connecting the I-beams to form a main frame structure of considerable weight, a plurality of blade carrying beams arranged in broad V-form and disposed beneath the main frame of the machine, blades carried by said beams and having the cutting edges substantially below them, means for adjustably suspending the blade carrying beams beneath the main frame of the machine, said suspension means being independently adjustable whereby the blade carrying beams at the rear of the machine may be adjusted to operate at a slightly lower depth than the corresponding beams at the front of the machine, a series of wheels at the front, rear and intermediate portions of the main frame of the machine for supporting the weight of the structure when depressions in the roadbed are encountered by the blades, said wheels being spaced from the blades.

JOHN BAILEY PRIDGEN.